United States Patent [19]

Freure et al.

[11] 3,870,683

[45] Mar. 11, 1975

[54] LIGHT STABLE POLYURETHANES BASED ON DICYCLOHEXYL AND DIISOCYANATES

[75] Inventors: Robert J. Freure, Clarkson, Ontario; Maurice Moyle, Oakville, Ontario, both of Canada

[73] Assignee: Gulf Oil Canada Limited, Toronto, Ontario, Canada

[22] Filed: Dec. 21, 1971

[21] Appl. No.: 210,599

Related U.S. Application Data

[60] Continuation of Ser. No. 89,050, Nov. 12, 1970, abandoned, which is a division of Ser. No. 839,665, July 7, 1969, abandoned.

[52] U.S. Cl....260/75 NT, 260/77.5 AT, 260/453 AL
[51] Int. Cl........................ C08g 22/24, C08g 22/00
[58] Field of Search . 260/75 NT, 77.5 AT, 453 AL, 260/2.5 AT

[56] References Cited
UNITED STATES PATENTS

| | | | |
|---|---|---|---|
| 2,606,924 | 8/1952 | Whitman | 260/563 |
| 2,606,927 | 8/1952 | Bardvel et al. | 260/563 |
| 3,351,650 | 11/1967 | Cross et al. | 260/453 |
| 3,357,954 | 12/1967 | Kirkaldy | 260/75 |
| 3,510,456 | 5/1970 | Carr et al. | 260/75 |
| 3,535,287 | 10/1970 | Wynstra | 260/75 |

OTHER PUBLICATIONS

Siefken–Justus Liebig's Annalen der Chemie, Vol. 562, pages 75, 108, 126 (1949).

Kaplan et al. Journal of Paint Technology, Vol. 41, No. 537, pages 551–558 (1969).

Hackh's Chemical Dictionary, 3rd Ed., McGraw-Hill, N.Y. (1944) page 412.

*Primary Examiner*—R. S. Cockeram

[57] ABSTRACT

Polyurethanes may be formed from certain dicyclohexyl diisocyanates. That formed from 4,4'-dicyclohexyl diisocyanate is light stable.

1 Claim, No Drawings

LIGHT STABLE POLYURETHANES BASED ON DICYCLOHEXYL AND DIISOCYANATES

This application is a continuation of application Ser. No. 89,050 filed Nov. 12, 1970, (now abandoned) which is a division of U.S. application Ser. No. 839,665 filed July 7, 1969 (now abandoned).

This invention relates to certain urethane polymers.

Urethane polymers are extremely versatile in their uses owing to their high gloss appearance and chemical and abrasion resistance. Such uses include use in flexible and rigid foams, and as protective coatings, elastomers, fibres and adhesives.

Urethane polymers do, however, suffer from the disadvantage that they tend to discolour with age owing to their instability to ultra-violet radiation. This is a particular problem with polyurethane surface coatings, which are generally exposed to light. In many other of its uses, this problem is not serious, since the foam, elastomer etc., is not visible.

Urethane polymers are formed by the reaction of a dior polyisocyanate with an organic compound containing two or more groups having an active hydrogen atom. The presence of an active hydrogen is determined by the Zerewitinoff method. The polymers thus formed are largely characterized by urethane

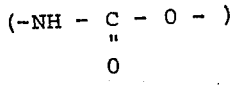

and urea

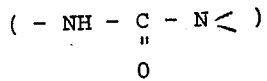

linkages.

Isocyanates react with water to form carbon dioxide and a urea through the intermediate carbamic acid and this reaction can be employed in the production of polyurethane foams.

Isocyanates generally used in the production of commercial urethane polymers are toluene diisocyanate (T.D.I.), generally as a mixture of the 2, 6- and 2, 4- derivatives:

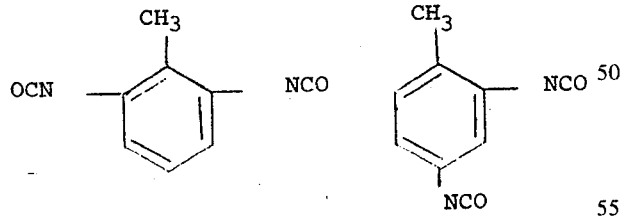

and diphenylmethane diisocyanate (M.D.I.)

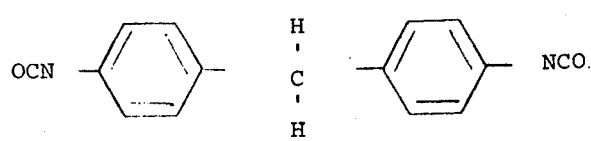

Polyurethanes derived from T.D.I. and M.D.I. have the disadvantage of "yellowing" on exposure to light.

Attempts have been made to prepare light-stable polyurethane coatings which will not yellow on exposure to light. Two approaches have been adopted: firstly, the use of ultra-violet absorbers, such as additives of the benzophenone type, and secondly, the use of dior polyisocyanates other than T.D.I. or M.D.I. The first method has the disadvantage that the physical properties of the urethane polymer may be affected and the second method the disadvantage that the isocyanates are more expensive to produce than the commonly used isocyanates, thereby giving a more costly urethane polymer.

Among the isocyanate materials used have been the cyclohexyl derivatives corresponding to the above-mentioned T.D.I. and M.D.I., i.e.:

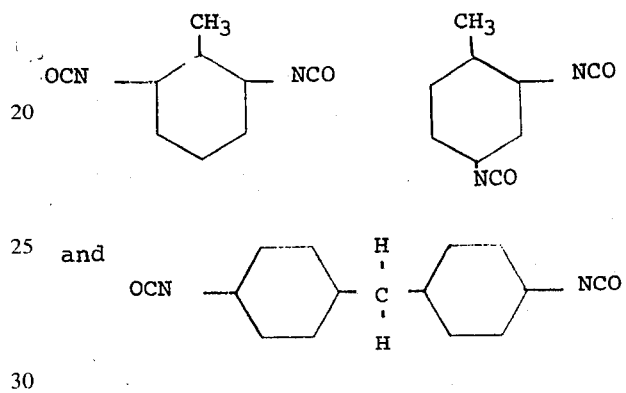

and

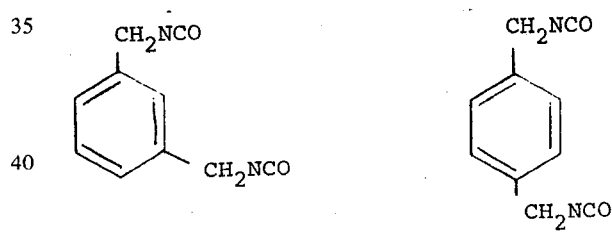

Other diisocyanate materials which have been used include xylylene diisocyanate, generally as a mixture of the 1,3- and 1,4- isomers:

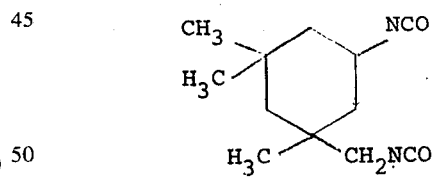

and isophorone diamine diisocyanate

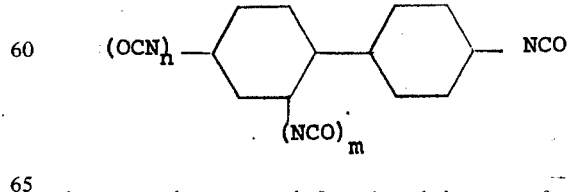

Polyurethanes prepared from these diisocyanates have been found to have better light stability than those prepared from T.D.I. and M.D.I. As noted above, these isocyanates are, however, expensive to manufacture.

The present invention provides a polyurethane which is the reaction product of a diisocyanate of the formula:

$$(OCN)_n - \text{C}_6\text{H}_{10} - \text{C}_6\text{H}_{10} - NCO$$
$$(NCO)_m$$

where $n$ and $m$ are each 0 or 1 and the sum of $n + m$ is 1, and a compound containing at least two active hydrogens.

Isocyanates can be prepared by a variety of different methods well known in the art. The most common as being typical of the procedures employed in the art to produce isocyanates.

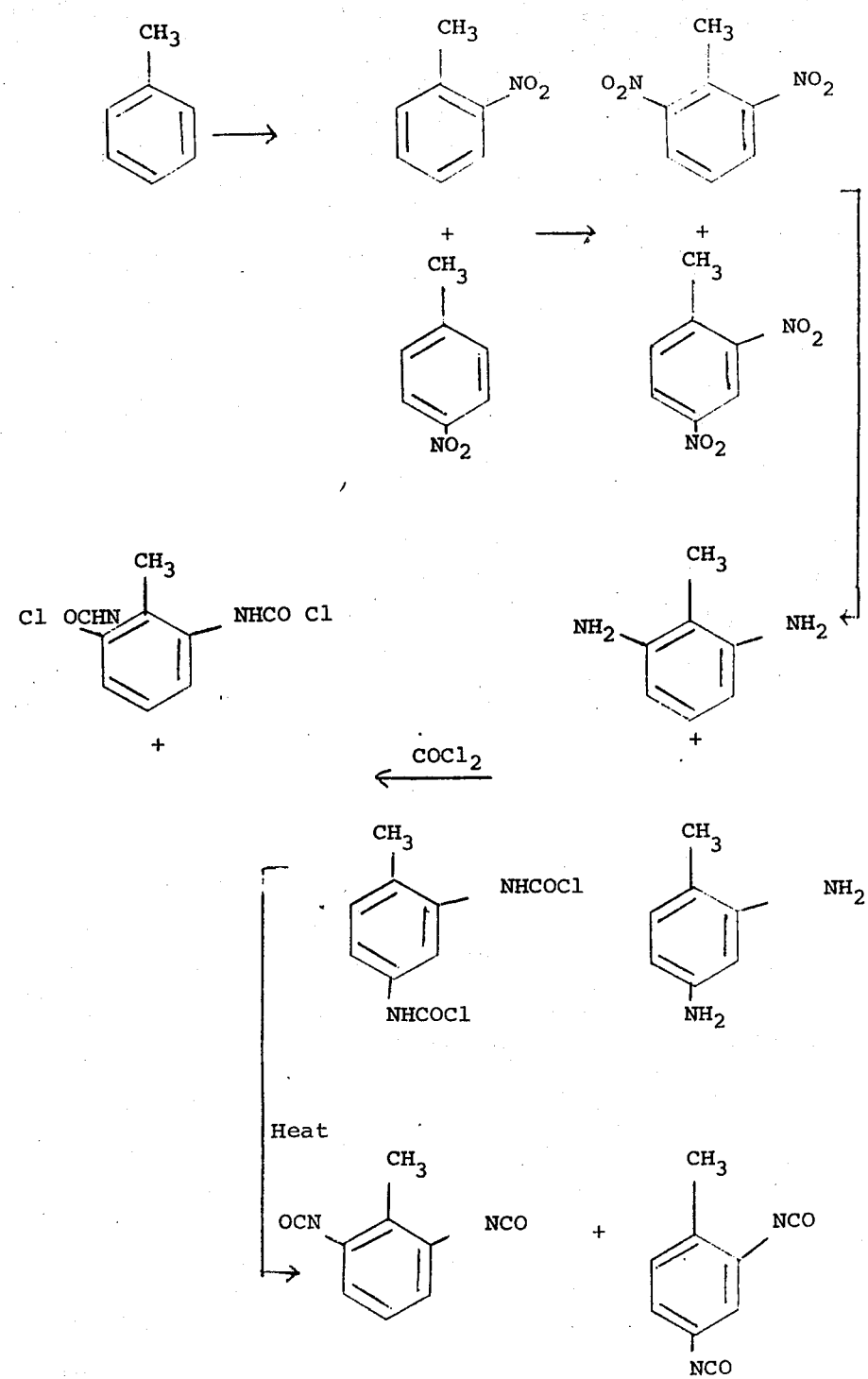

method involves phosgenation of the corresponding amino compound followed by the application of heat. The amino compound generally is formed by reduction of the corresponding nitro compound, although the amino compound could be prepared by other methods known in the art. The nitro compound itself is generally obtained from the corresponding hydrocarbon by nitration. The following illustrates the production of toluene diisocyanate as a mixture of the 2,4- and 2,6-isomers, The isocyanates used to form the urethanes of the present invention may be prepared by the procedure outlined above. Other methods known in the art for making isocyanates may be employed.

A suitable starting material is diphenyl. Diphenyl is a major constituent of the by-products formed in the dealkylation of toluene to form benzene. It therefore is cheap and readily available.

One procedure for the production of isocyanates useful for the production of the urethanes of the present invention from diphenyl is outlined below:

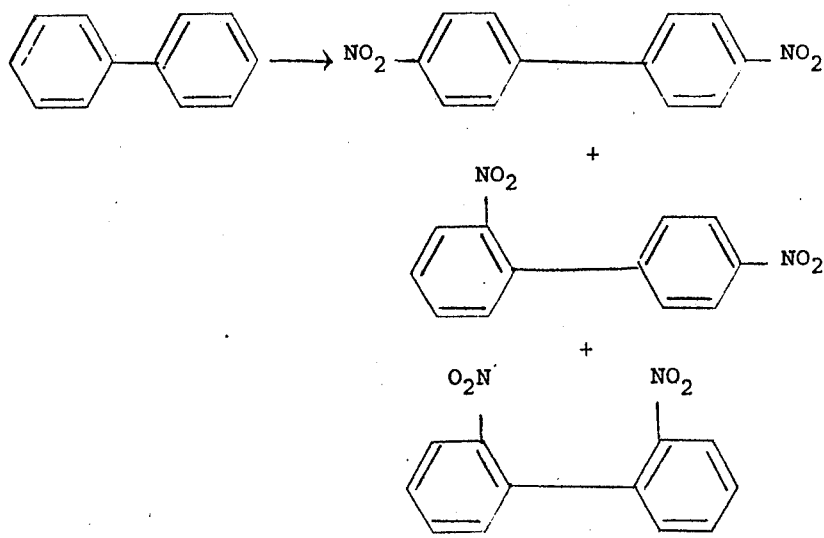

The first step thus involves the preparation of a mixture of 4,4'-, 2,4'- and 2,2'- dinitrodiphenyls. This is accomplished generally in two stages, forming first a mixed mono-nitro product, nitrated in the 2- and 4- positions, and secondly, the mixed dinitro product by using more vigorous nitration conditions. The 4,4'-dinitro compound is the least soluble of the isomeric dinitrodiphenyls and under certain conditions, for example, nitration of diphenyl in a relatively large excess of 80% nitric acid may be obtained free of the other isomers and treated separately. The 2,2'- and 2,4'-isomers may be separated by fractional crystallization. The procedure will herein be further described with reference to the 4,4'-isomer. Treatment of the 2,2'- and 2,4'-isomers is described below.

In an alternative procedure, the starting material is 4-nitrodiphenyl available as a commercial material produced by nitration of diphenyl under controlled conditions. Nitration of this material produces a high proportion of the 4,4'-dinitrodiphenyl, along with some 2,4'-dinitrodiphenyl.

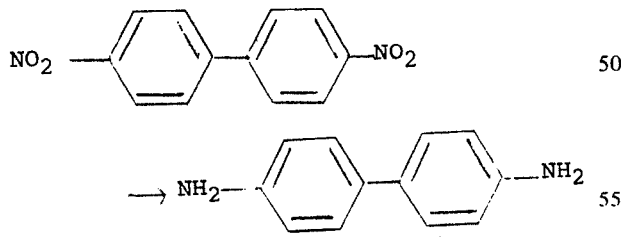

The second step involves the reduction of the dinitrodiphenyl to the corresponding diaminodiphenyl. This reduction may be carried out in a variety of ways. The preferred method involves catalytic hydrogenation in a suitable solvent.

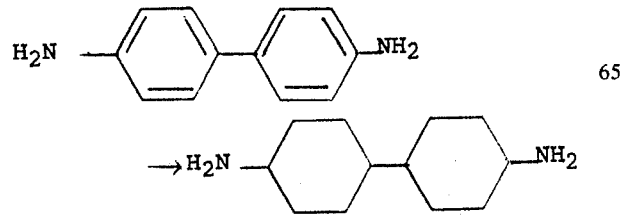

The third step involves reduction of benzidine to 4,4'-diaminodicyclohexyl and may be carried out in the presence of ammonia as a means of reducing possible side reactions. The preferred reduction is carried out by catalytic hydrogenation in the presence of a noble metal catalyst such as ruthenium, ruthenium oxide, platinum or rhodium or modified noble metal catalyst such as an oxide.

Where the 2,4'-diamino isomer, produced by suitable reduction of the corresponding 2,4'-dinitrodiphenyl, is reduced in this way, the 2,4'-diaminodicyclohexyl is produced, i.e.:

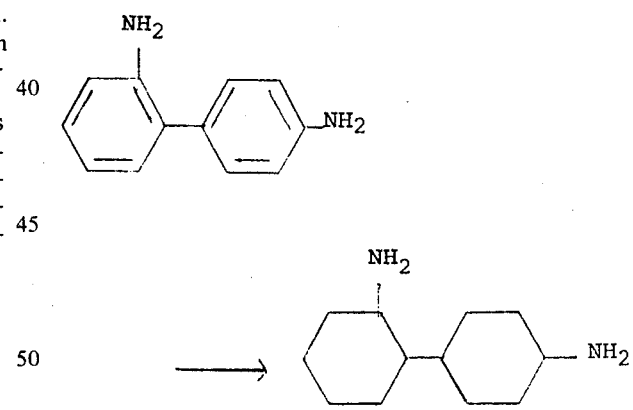

Where, however, the 2,2'-diamino isomer is reduced, the product deaminates and the corresponding 2,2'-diaminodicyclohexyl is not formed.

IV.

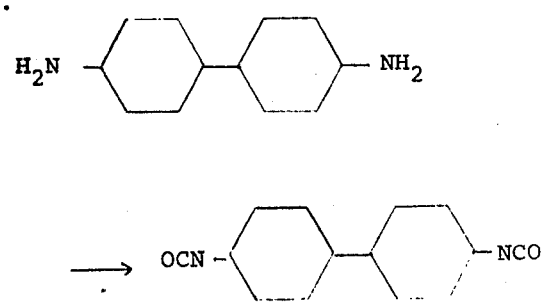

The final step is the formation of the isocyanate from the amine. This is accomplished by phosgenation, forming first the carbamyl chloride of the amine, followed by heating to eliminate HCl. This operation is well known as indicated above in the description of the preparation of toluene diisocyanate.

Where the phosgenation reaction is carried out on the 2,4'-diamino isomer, the corresponding diisocyanate is formed, i.e.

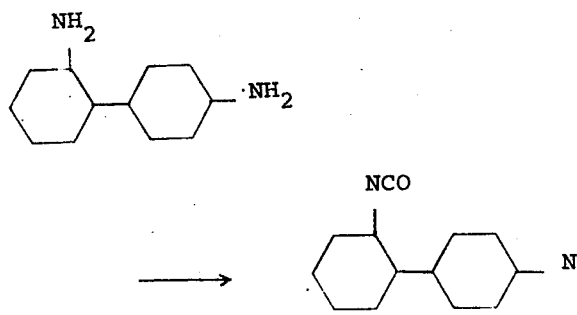

The diaminodiphenyls may be formed by alternative routes, such as by formation of a mixture of dichlorodiphenyls by chlorination of diphenyl followed by ammonation of the chloro groups. The mixture of isomers may be separated, and the 4,4'-and 2,4'-diaminodiphenyls subjected to the operations indicated above, to produce the above diisocyanates. Thus:

The diisocyanates may be formed into what generally may be referred to as the urethane polymers of the present invention by reaction with organic compounds containing two or more groups having an active hydrogen. Generally, any compound having an active hydrogen will react with an —NCO group to yield urethane groups. The alcohol group is preferred because it is readily available.

Examples of suitable types of organic compounds containing at least two active hydrogen-containing groups which are reactive with an isocyanate group are hydroxyl polyesters, polyhydric polyalkylene ethers, polyhydric polythioethers, polyhydric polyacetates, aliphatic polyols, including alkane, alkene, alkyne diols, triols, tetrols and the like, aliphatic thiols including alkane, alkene and alkyne thiols having two or more —SH groups, polyamines including aromatic, aliphatic and heterocyclic diamines, triamines, tetramines and the like, as well as mixtures thereof.

Compounds which contain two or more different groups within the above defined classes may be used, such as amino-alcohols which contain an amino group and a hydroxyl group, amino-alcohols which contain two amino groups and one hydroxyl group and the like. Compounds may be used which contain one —SH group and one —OH group, or two —OH groups and one —SH group as well as those which contain an amino group and an —SH group and the like.

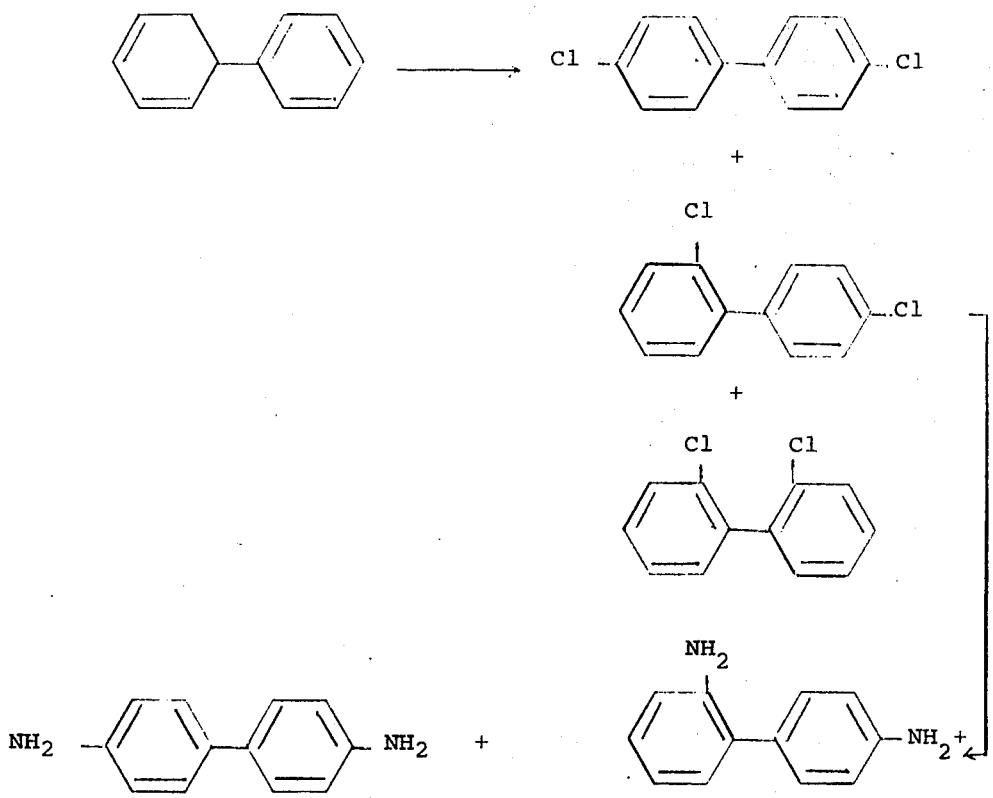

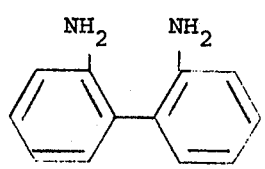

The molecular weight of the organic compound containing at least two active hydrogen-containing groups may vary over a wide range. Preferably, at least one of the organic compounds containing at least two active hydrogen-containing groups has a molecular weight of at least about 200, although materials having molecular weights below this value may be used, and preferably between about 500 and about 5,000 with a hydroxyl number within the range of from about 25 to about 800 and acid numbers, where applicable, below about 5. A satisfactory upper limit of the molecular weight of the organic compound containing at least two active hydrogen-containing groups is about 10,000 but this limitation may vary so long as satisfactory mixing of the organic compound containing at least two active hydrogen-containing groups with the novel isocyanates of the invention can be achieved. In addition to the high molecular weight organic compound containing at least two active hydrogens, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl-succinic acid, phthalic anhydride isophthalic acid, terephthalic acid, hemimelletic acid, trimelletic acid, trimesic acid, mellophonic acid, prehnitic acid, pyromellitic acid, benzenepentacarboxylic acid and the like. Any suitable polyhydric alcohol may be used such as, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

A preferred hydroxyl polyester is an ethylene propylene adipate having a molecular weight about 2,000, a hydroxyl number about 56 and an acid number below about 5.

Any suitable polyhydric polyalkylene ether may be used, such as, the condensation product of an alkylene oxide beginning with any suitable initiator. The initiator may be a difunctional compound including water so that the resulting polyether is essentially a chain of repeating alkylene oxy groups as in polyethylene ether glycol, polypropylene polybutylene ether glycol and the like; or the initiator may be any suitable active hydrogen-containing compound which may be a monomer or even a compound having a relatively high molecular weight including other active hydrogen-containing compounds as disclosed herein. It is preferred that the initiators have from 2 to 8 active sites to which the alkylene oxides may add, including, for example, amines, alcohols and the like. Any suitable alkylene oxide may be used such as, ethylene oxide, propylene oxide, butylene oxide, amylene oxide, tetrahydrofuran, epihalohydrins such as epichlorohydrin, styrene oxide and the like. Any suitable initiator may be used, including, for example, water, polyhydric alcohols, preferably having 2 to 8 hydroxyl groups, amines, preferably having 2 to 8 replaceable hydrogen atoms bonded to nitrogen atoms. It is preferred to use alkylene oxides which contain from 2 to 5 carbon atoms and, generally speaking, it is advantageous to condense from about 5 to about 30 moles of alkylene oxide per functional group of the initiator. There are many desirable processes for the preparation of polyhydric polyalkyleneethers including U.S. Pats. Nos. 1,922,459, 3,009,939 and 3,061,625.

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, methylene bis (o-chloraniline), p, p', p''-triphenylmethane triamine, ethylene diamine, propylenediamine, propylene triamine, N,N,N',N'-tetrakis-(2-hydroxypropyl) ethylene diamine, diethylene triamine and the novel 2,4'-diaminodicyclohexyl. A preferred polyhydric polyoxyalkylene ether is polyoxypropylene glycol with a molecular weight of about 2,000 and a hydroxyl number of about 56.

Any suitable aliphatic polyol may be used such as, alkane diols, for example, ethylene glycol, 1,3-propylene glycol, 1,2-propylene glycol, 1,3-butylene glycol, 1,5-pentane diol, 1,4-butane diol, 1,3-pentane diol, 1,6-hexane diol, 1,7-heptane diol, 2,2-dimethyl -1,3-propane diol, 1,8-octane diol, and 1,20-eicosane diol; alkene diols, for example, 2-butene -1,4-diol, 2-pentene -1,5-diol, 2-hexene -1,6-diol, and 2-heptene -1,7-diol; alkyne diols, for example, 2-butyne -1,4-diol; alkane triols, for example, 1,3,6-hexane triol, 1,3,7-heptane triol, 1,4,8-octane triol, and 1,6,12-dodecane triol; alkene triols, for example, 2-hexene-1,4,-triol; alkyne triols, for example, 2-hexyne -1,3,6-triol; alkane tetrols, for example 1,2,5,6-hexane tetrol; alkene tetrols, for example, 3-heptene -1,2,6,7-tetrol; and alkyne tetrols for example, 4-octyne -1,2,7,8-tetrol.

Any suitable polyamine may be used including: aromatic polyamines such as p-amino aniline, 1,5-diamino naphthalene, 2,4-diamino tolylene, 1,3,5-benzene triamine, 1,2,3-benzene triamine, 1,4,5,8-naphthalene tetramine and the like; and aliphatic polyamines such as, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine 2,4-diaminodicyclohexyl and the like.

Polyurethane coatings prepared from the 4,4'-dicyclohexyl diisocyanate show improved light stability when compared with urethane polymers produced from toluene diisocyanate and from diphenyl methane diisocyanate. Polyurethane foams and elastomers may be prepared by known procedures from the diisocyanates prepared in the above manner.

The invention is illustrated by the following Examples:

EXAMPLE I

A suspension of 49 parts of benzidine and 2 parts of ruthenium dioxide in 125 parts of dioxane were placed in a stainless steel stirred autoclave. Hydrogen then was introduced under a pressure of about 2,000 psig and the temperature maintained at about 115°C for about 10 hours during which time approximately the theoretical quantity of hydrogen to produce 4,4'-diaminodicyclohexyl was absorbed.

On cooling, the contents of the autoclave were filtered to remove the catalyst and the dioxane was distilled under reduced pressure. A U.V. spectrum of the product showed negligble absorption at 286–290 m$\mu$ indicating complete reduction of the benzidine to 4,4'dicyclohexyl-diamine.

A solution of 98 parts of the 4,4'diaminodicyclohexyl in about 1,000 parts of o-dichlorobenzene was prepared. A rapid stream of carbon dioxide was passed through the solution for about 90 minutes. During this time, the temperature of the solution rose from about 20° to about 45°C over 70 minutes and a fine suspension was formed. The solution then slowly cooled down to around 30°C at the end of the 90 minutes.

The stirred suspension was then cooled to around 0°–10°C and maintained within this temperature range for about 1 hour. During this time, about 150 parts of phosgene were introduced into the suspension. At the end of this time, phosgene was continued to be introduced at a rate of about 1 part per minute while the temperature was steadily raised. When the temperature reached 85°C a vigorous reaction commenced, and, at the end of 1½ hours, the reflux temperature of 180°C was reached. This temperature was maintained for a further 2½ hours at the end of which time the passage of phosgene was stopped. A stream of nitrogen was then passed rapidly through the suspension for about one hour to remove excess phosgene.

The solvent was removed by distillation under reduced pressure and the product was obtained by vacuum distillation. 85% yield (102 parts) of 95% pure 4,4'-dicyclohexyl diioscyanate was obtained. Redistillation yielded pure water-white liquid product of boiling point 180°C/0.05mm Hg. Analysis of the product yielded the following results:

Calculated for $C_{14}H_{20}N_2O_2$: C, 67.71; H, 8.12; N, 11.28.
Found: C, 67.68; H, 8.27; N, 11.10.

EXAMPLE 2

Reaction of 4,4'-dicyclohexyl diisocyanate with an excess of di-n-butylamine in toluene gives the corresponding urea derivative having a melting point 158° to 161°C.

Analysis:
Calculated for $C_{30}H_{58}N_4O_2$: C, 71.09; H, 11.54; N, 11.06.
Found: C, 71.10; H, 11.60; N, 11.10.

Reaction of 4,4'-dicyclohexyl diisocyanate with an excess of anhydrous methyl alcohol gives the corresponding urethane derivative of melting point 253° to 255°C.

Analysis:
Calculated for $C_{16}H_{28}N_2O_4$: C, 61.51; H, 9.03; N, 8.97.
Found: C, 61.44; H, 9.21; N, 8.93.

Solutions of about 2½ parts of each of the above derivatives in 100 parts of dimethylsulfoxide were prepared. These solutions were then mounted on a white topped turn-table and exposed to a 275 watt sunlight lamp. The urea and urethane derivatives of toluene diisocyanate (80% 2,4- and 20% 2,6-) and of diphenylmethane diisocyanate were prepared and similarly exposed to the sunlight lamp. The percentage transmittance at 430 m$\mu$ was measured for each solution at various time intervals. The rate of change of percentage transmittance is a measure of the rate of "yellowing" of the material. The results are reproduced in the following Table.

Table

| Derivative | % Transmittance after | | | | |
|---|---|---|---|---|---|
| | 0 hrs | 4 hrs | 21 hrs | 43 hrs | 280 hrs |
| 4,4'-dicyclohexyldiisocyanate | | | | | |
| -urea | 94 | — | 83 | 80 | — |
| -urethane | 95 | — | 95 | 95 | 94 |
| Toluene diisocyanate | | | | | |
| -urea | 98 | 88 | 64 | 35 | — |
| -urethane | 99 | 88 | 38 | 9 | — |
| Diphenylmethane diisocyanate | | | | | |
| -urea | 98 | 80 | 24 | 3 | — |
| -urethane | 98 | 22 | 21 | 16 | — |

These results show that the rate of yellowing or discolouration of the urea and urethane derivatives of the novel 4,4'-dicyclohexyldiisocyanate is very much less than that of the urea and urethane derivatives of toluene diisocyanate and of diphenylmethane diisocyanate. These results indicate that urethane polymers produced from the novel 4,4'-dicyclohexyl diisocyanate of the present invention will be more light stable than those produced from toluene diisocyanate and diphenylmethane diisocyanate.

EXAMPLE 3

About 1,500 parts by volume of 70% nitric acid was heated to about 65°C and about 154 parts by volume of diphenyl added. No reaction was observed until the temperature reached about 90°C at which stage a vigorous reaction of short duration set in, the temperature rising to about 115°C. After about 2 minutes the temperature was raised to about 125°C during about 10 minutes then allowed to cool. The mixture was poured into ice/water, the product collected by filtration, washed thoroughly with water and dried to constant weight. The yield of product was about 242 parts by weight or 99% of isomeric dinitrodiphenyls and the isomeric distribution, determined by gas chromatographic analysis, was about 13% of 2,2'-, and about 53% of 2,4'- and about 33% of 4,4'-dinitrodiphenyl.

Pure 4,4'-dinitrodiphenyl, melting point 234°–237°C, pure 2,4'-dinitrodiphenyl, melting point 93°–95°C, and pure 2,2'-dinitrodiphenyl, melting point 126°–128°C were obtained by fractional crystallization of the mixed isomers.

EXAMPLE 4

About 800 parts by volume of 70% nitric acid was heated to about 60°C and about 60 parts by weight of 4-nitrodiphenyl added. Heating was continued and no visible reaction took place until the temperature reached about 85°C. At this point, a vigorous reaction of short duration set in and the temperature rose to about 95°C. A further 139 parts by weight of 4-nitrodiphenyl was added in portions during about 30 minutes so that the temperature remained at about 95°C without external heating. The temperature was raised to about 110°C during about 10 minutes then allowed to cool to about 75°C prior to filtration.

The filtered product was washed with about 100 parts by volume of 70% nitric acid, then thoroughly with boiling water, and dried to constant weight. The yield of pure 4,4'-dinitrodiphenyl of melting point 234°–237°C was about 125 parts by weight or 51%.

The filtrate and washings were poured into ice water, the product filtered, washed thoroughly with cold water and dried to constant weight. The yield of isomeric dinitrodiphenyls was about 119 parts by weight or 49%. Gas chromatographic analysis of this product indicated that the composition was about 88% of the 2,4'- and about 10% of the 4,4'-isomer, so that the overall ratio of 2,4'- and 4,4'-dinitrodiphenyl formed in the reaction was about 44 to 56.

Repeated crystallization of the mixed dinitrodiphenyls from iso-propanol gave pure 2,4'-dinitrodiphenyl of melting point 93°–95°C.

EXAMPLE 5

About 500 parts by volume of 80% nitric acid was stirred at about 25°C and about 50 parts by weight of 4-nitrodiphenyl added. An exothermic reaction took place and the temperature rose to about 55°C. A further 149 parts by weight of 4-nitrodiphenyl was added in portions at such a rate that the temperature remained at about 50°–55°C. After a further 30 minutes when the temperature had fallen to about 30°C, the product was filtered, washed with about 100 parts by volume of 80% nitric acid then boiling water, and dried to constant weight. The yield of pure 4,4'-dinitrodiphenyl with melting point 234°–237°C was about 122 parts by weight or 50%.

The filtrate and washings were treated as in Example 4 to give essentially the same yields and isomeric distribution of dinitrodiphenyls.

EXAMPLE 6

A suspension of about 122 parts by weight of a mixture consisting of about 90% 2,4' and 10% 4,4'-dinitrodiphenyl and about 2 parts by weight of 5% palladium on charcoal in about 750 parts by volume of iso-propanol was hydrogenated at about 85°C and about 2 atmospheres pressure until uptake of hydrogen ceased. The catalyst was separated from the clear solution by filtration and the solvent evaporated under reduced pressure leaving about 92 parts by weight of semi-crystalline isomeric diaminodiphenyls.

The isomeric diaminodiphenyls were taken up in a mixture of about 100 parts by volume of concentrated hydrochloric acid and 200 parts of water, and about 5 parts by volume of concentrated sulphuric acid added to the clear solution. The insoluble sulphate of 4,4'-diaminodiphenyl was separated by filtration and the filtrate treated with about 300 parts by volume of concentrated hydrochloric acid.

The yield of pure 2,4'-diaminodiphenyl dihydrochloride which crystallized on standing was about 103 parts by weight or 80%, and the melting point about 303°C with decomposition. Pure 2,4'-diaminodiphenyl was liberated by treatment of the dihydrochloride with an excess of sodium hydroxide and isolated by extraction with benzene.

EXAMPLE 7

A suspension of about 122 parts by weight of 2,4-dinitrodiphenyl and 2 parts by weight of 5% palladium on charcoal in about 500 parts by volume of iso-propanol was hydrogenated at about 85°C and about 2 atmospheres pressure until uptake of hydrogen ceased. The catalyst was separated from the clear solution by filtration and the solvent evaporated under reduced pressure giving a yield of about 90 parts by weight (98%) of the known 2,4'-diaminodiphenyl which readily crystallized on cooling.

EXAMPLE 8

A suspension of about 122 parts by weight of 4,4'-dinitrodiphenyl and about 2 parts by weight of 5% palladium on charcoal in about 1250 parts by volume of iso-propanol was hydrogenated at about 85°C and about 2 atmospheres pressure until uptake of hydrogen ceased. The catalyst was separated from the clear solution by filtration and the product allowed to crystallize. The yield of pure 4,4'-diaminodiphenyl (benzidine) of melting point about 125°C was about 79 parts by weight of 86%. Concentration of the liquors afforded a further 10 parts by weight or 11% of 4,4'-diaminodiphenyl.

EXAMPLE 9

A suspension of about 184 parts by weight of 2,4'-diaminodiphenyl and about 25 parts by weight of 5% ruthenium on alumina in about 750 parts by volume of iso-propanol which had previously been saturated at about 20°C with anhydrous ammonia was hydrogenated at about 135°C and a pressure of about 3,000 p.s.i. Uptake of hydrogen ceased after about 3 hours. On cooling the catalyst was separated by filtration, the solvent evaporated under reduced pressure and the product flash distilled at about 200°C and about 0.1 mm. Hg. The total product, about 180 parts by weight, had a neutralization equivalent of 102. Fractionation through a short column gave a small fore-run then about 165 parts by weight of pure 2,4'-dicyclohexyl diamine, boiling point about 135°C/0.1 mm. Hg. and neutralization equivalent 98. Analysis of the product gave the following results:

Calculated for $C_{12}H_{24}N_2$: C, 73.40; H, 12.40; N, 14.30.
Found: C, 73.67; H, 12.39; N, 14.31.

EXAMPLE 10

A suspension of about 184 parts by weight of 4,4'-diaminodiphenyl and about 25 parts by weight of 5% ruthenium on alumina in about 850 parts by volume of iso-propanol which had previously been saturated at about 20°C. with anhydrous ammonia was hydrogenated at about 125°C and a pressure of 3,000 p.s.i. Uptake of hydrogen ceased after about 75 minutes. On cooling, the catalyst was separated by filtration, the solvent evaporated under reduced pressure and the product flash distilled at about 200°C and about 0.1 mm. Hg. The total product, about 180 parts by weight, had a neutralization equivalent of 101. Fractionation through a short column gave a small fore-run then about 170 parts by weight of pure 4,4'-dicyclohexyldiamine, boiling point about 150°C/0.1 mm. Hg. and neutralization equivalent 99. The product readily crystallized on standing, and its ultraviolet absorption spectrum showed negligible absorption at 286–290 m$\mu$, indicating complete saturation of the benzene rings. The product reacted readily with carbon dioxide and was kept under a nitrogen atmosphere as much as possible.

EXAMPLE 11

A suspension of about 49 parts by weight of 4,4'-diaminodiphenyl and about 2 parts by weight of ruthenium dioxide in about 125 parts by volume of dioxane was hydrogenated at about 115°C and a pressure of about 2,000 p.s.i. Uptake of hydrogen ceased after about 10 hours and the reaction mixture was cooled. The catalyst was separated by filtration, the solvent evaporated under reduced pressure and the product distilled. Redistillation gave pure 4,4'-dicyclohexyl diamine, boiling point about 150°C/0.1 mm. Hg. and neutralization equivalent 99. The product readily crystallized on standing and the ultraviolet absorption spectrum showed negligible absorption about 220 m$\mu$ indicating complete saturation of the aromatic rings.

EXAMPLE 12

A rapid stream of carbon dioxide was passed through a solution of about 98 parts by weight of 2,4'-dicyclohexyl diamine in about 1,000 parts by volume of ortho-dichlorobenzene, initially at about 10°C. An exothermic reaction resulted and the temperature rose to about 45°C. After about 90 minutes, when the temperature had dropped to about 25°C, the passage of carbon dioxide was stopped.

The resulting suspension was cooled to about 0°C and a stream of phosgene passed through at a rate of about 3 parts by weight per minute. Cooling was necessary during this operation to prevent the temperature from exceeding about 20°C. After about 60 minutes the rate of flow of phosgene was reduced to about 1 part by weight per minute and the temperature of the reaction mixture raised as rapidly as was practicable. After about 60 minutes, when the temperature was about 90°C a vigorous reaction set in. After about 60 minutes the temperature was raised from 115° to 175°C during about 60 minutes and kept at this point for about 2 hours. Passage of phosgene was then stopped and replaced by a rapid stream of nitrogen to remove traces of phosgene and hydrogen chloride.

The solvent was evaporated under reduced pressure and the product obtained by vaccum distillation. Redistillation yielded about 102 parts by weight or 85% of pure 2,4'-dicyclohexyl diisocyanate with boiling point about 135°C/0.1 mm. Hg. Analysis of the product gave the following results:

Calculated for $C_{14}H_{20}N_2O_2$: C, 67.71; H, 8.12; N, 11.28.
Found: C, 68.07; H, 8.22; N, 11.02.

Reaction of 2,4'-dicyclohexyl diisocyanate with a slight excess of di-n-butylamine in benzene gave the corresponding urea with melting point 133°–135°C.

Analysis:
Calculated for $C_{30}H_{58}N_4O_2$: C, 71.09; H, 11.54; N, 11.06.
Found: C, 70.93; H, 11.82; N, 11.28.

EXAMPLE 13

A rapid stream of carbon dioxide was passed through a solution of about 98 parts by weight of 4,4'-dicyclohexyl diamine in about 1,000 parts by volume of orthodichlorobenzene, initially at about 10°C. An exothermic reaction resulted and the temperature rose to about 50°C. After about 90 minutes when the temperature had fallen to about 25°C, the passage of carbon dioxide was stopped.

The resulting suspension was cooled to about 0°C and about 150 parts by weight of phosgene passed through the reaction mixture during about 60 minutes, the rate of flow of phosgene being varied to keep the temperature below about 10°C. The rate of flow of phosgene was reduced to about 1 part by weight per minute and the temperature raised as rapidly as was practicable, reaching about 85°C after about 60 minutes. At this point a vigorous reaction set in and the temperature was raised successively to about 120°C and about 175°C during hourly intervals. After a further 2 hours at 175°C the stream of phosgene was replaced by a rapid stream of nitrogen to remove traces of phosgene and hydrogen chloride.

The solvent was evaporated under reduced pressure and the product obtained by vacuum distillation. Redistillation gave pure 4,4'-dicyclohexyl diisocyanate, a water white liquid with boiling point about 175°C/0.1 mm. Hg., the yield being about 99 parts by weight or 80%. The product readily crystallized on standing and on analysis gave the following results:

Calculated for $C_{14}H_{20}N_2O_2$: C, 67.71; H, 8.12; N, 11.28.
Found: C, 67.68; H, 8.27; N, 11.10.

Reaction of 4,4'-dicyclohexyl diisocyanate with a slight excess of di-n-butylamine in benzene gave the corresponding urea, melting point 158°–161°C.

Analysis:
Calculated for $C_{30}H_{58}N_4O_2$: C, 71.09; H, 11.54; N, 11.06.
Found: C, 71.10; H, 11.60; N, 11.10.

Reaction of 4,4'-dicyclohexyl diisocyanate with an excess of anhydrous methanol gave the corresponding urethane, melting point 253–255°C.

Analysis:
Calculated for $C_{16}H_{28}N_2O_4$: C, 61.51; H, 9.03; N, 8.97.
Found: C, 61.44; H, 9.21; N, 8.93.

EXAMPLE 14

About 100 parts by weight of polypropylene glycol with a molecular weight of about 2000 and an hydroxyl number of about 56 was heated in a vacuum at about 100°C for about 2 hours. When the temperature had dropped to about 80°C the vessel was purged with nitrogen and about 37 parts by weight of 4,4'-dicyclohexyl diisocyanate added. The mixture was stirred under nitrogen for about 3 hours at about 100°C, at which stage the clear colourless prepolymer had a free isocyanate content of about 6%.

About 50 parts by weight of the above prepolymer and about 3.2 parts by weight of butane-1,4-diol and about 50 parts by volume of cellosolve acetate were stirred under nitrogen until homogeneous, and when the temperature had fallen to about 30°C, about half a part of stannous octoate (about 28% stannous ion) was added. The composition was poured onto a glass plate and kept in an oven at about 100°C for about 1 hour.

The resulting coating did not yellow on prolonged exposure to ultraviolet light.

EXAMPLE 15

About 100 parts by weight of ethylene propylene adipate with a molecular weight of about 2,000, an hydroxyl number of about 56 and an acid number of about 2 was heated in a vacuum at about 100°C for about 2 hours. When the temperature had fallen to about 80°C the vessel was purged with nitrogen and about 37 parts by weight of 4,4'-dicyclohexyl diisocyanate added. The mixture was stirred under nitrogen at about 100°C for about 3 hours at which stage the clear colourless prepolymer had a free isocyanate content of about 6%.

About 50 parts by weight of the above prepolymer and about 3.2 parts by weight of trimethylol propane in about 50 parts by volume of cellosolve acetate were stirred under nitrogen until homogeneous. When the temperature was about 30°C about half a part of stannous octoate (about 28% stannous ion) was added, the composition poured onto glass plates and kept in an oven for about 1 hour at about 100°C.

The resulting coatings did not yellow on prolonged exposure to ultraviolet light.

EXAMPLE 16

About 676 parts of a polyol with molecular weight about 690, equivalent weight about 115 and hydroxyl number about 490 was mixed with about 15 parts of triethylenediamine, about 100 parts of trichlorofluoromethane and about 19 parts of a silicone oil. When the mixture was homogeneous, a further 205 parts of trichlorofluoromethane was mixed in and the resulting crosslinking component stored in a tared can.

About 62 parts of 4,4'-dicyclohexyl diisocyanate and about 12 parts of a polyol with molecular weight about 690, equivalent weight about 115 and hydroxyl number about 490 were stirred under nitrogen for about 1 hour at about 75°C. At this stage the excess of free isocyanate in the prepolymer was about 27%.

About 45 parts of the above prepolymer and about 40 parts of the above crosslinking component were mixed and about half a part of stannous octoate (28% stannous ion) was added with vigorous stirring. After about 40 seconds foaming began and the mixture was poured into a mould where it expanded into a rigid polyurethane foam.

EXAMPLE 17

About 24 parts of the 4,4'-dicyclohexyl diisocyanate polypropylene glycol prepolymer with a free isocyanate excess of about 6% of Example 14 was warmed to about 90°C and mixed with about 4.7 parts by weight of molten methylene-bis-(ortho-chloroaniline) and about half a part of stannous octoate (about 28% stannous ion) thoroughly mixed in. THe resulting mixture was kept for about 30 minutes at about 6,000 p.s.i. and about 100°C, then for about 60 minutes at about 100°C to form a polyurethane elastomer.

EXAMPLE 18

About 31 parts of 2,4'-dicyclohexyl diisocyanate and about 6 parts of a polyol with a molecular weight of about 690, and equivalent weight of about 115 and an hydroxyl number of about 490 was stirred under nitrogen for about 1 hour at about 75°C. At this stage, the excess of free isocyanate in the prepolymer was about 25.5%.

About 22 parts of the above prepolymer and about 20 parts of the crosslinking component of Example 16 were mixed and about 1 part of stannous octoate added with vigorous stirring. After about 30 seconds foaming began and the mixture was poured into a mould where it expanded into a rigid polyurethane foam.

EXAMPLE 19

About 125 parts of polypropylene glycol with a molecular weight of about 2,000 and a hydroxyl number of about 56 was heated under vacuum for about 2 hours at about 100°C. When the temperature had dropped to about 80°C, the vessel was purged with nitrogen, about 46 parts of 2,4'-dicyclohexyl diisocyanate added, and the mixture stirred under nitrogen for about 3 hours at about 100°C. At this stage the excess of free isocyanate was about 7.5%.

About 25 parts of the above prepolymer at about 90°C, about 6 parts of molten methylene-bis (ortho-chloroaniline) and about 1 part of stannous octoate were thoroughly mixed and kept at about 6,000 p.s.i. and 100°C for about 1 hour then at about 100°C for 1 hour to form a polyurethane elastomer.

EXAMPLE 20

About 37 parts of an ethylene-propylene adipate with a molecular weight of about 2,000 and an hydroxyl number of about 61 was heated under vacuum for about 2 hours at about 100°C. When the temperature had fallen to about 80°C, the vessel was purged with nitrogen, about 16 parts of 4,4'-dicyclohexyl diisocyanate added, and the mixture heated under nitrogen for about 2 hours at about 100°C. The free isocyanate content of the prepolymer at this stage was about 6.9%.

About 30 parts of the above prepolymer was heated to about 90°C, about 6.6 parts of molten methylene bis (ortho-chloroaniline) added and thoroughly mixed with stannous octoate catalyst. After keeping at about 100°C and about 6000 p.s.i. for about 30 minutes and at about 100°C for about 1 hour, the resulting elastomer had a Shore A hardness of about 96, a tensile at break of about 4,100 p.s.i. and an elongation of about 525%.

EXAMPLE 21

About 37 parts of polytetramethylene glycol with a molecular weight of about 2,000 and an hydroxyl number of about 56 was heated under vacuum for about 2 hours at about 100°C. When the temperature had dropped to about 80°C, the vessel was purged with nitrogen, about 16 parts of 4,4'-dicyclohexyl diisocyanate added, and the mixture stirred under nitrogen for about 2 hours at about 100°C. The free isocyanate content of the prepolymer at this stage was about 7.3%.

About 30 parts of the above prepolymer was heated to about 90°C, about 7 parts of molten methylene-bis (ortho-chloroaniline) added and thoroughly mixed with stannous octoate catalyst. After keeping at about 100°C and about 6,000 p.s.i. for about 30 minutes then at about 100°C for a further 1 hour, the resulting elastomer had a Shore A hardness of about 97, a tensile at break of about 32,000 p.s.i. and an elongation of about 300%.

Many modifications are possible within the scope of the present invention.

What we claim is:

1. A polyurethane comprising the reaction product of a diisocyanate of the formula:

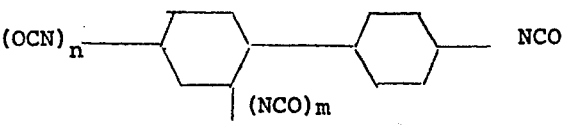

where $n$ and $m$ are each 0 or 1 and the sum of $n + m$ is 1, and an organic compound containing at least two active hydrogens, said polyurethane being cross-linked by a compound of the formula:

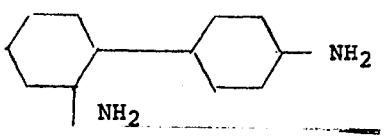

* * * * *